United States Patent
Arnold

(12)
(10) Patent No.: US 6,254,203 B1
(45) Date of Patent: Jul. 3, 2001

(54) METHOD FOR DETERMINING THE DECELERATION OF A MOTOR VEHICLE

(75) Inventor: Armin Arnold, Pyrbaum (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/248,188

(22) Filed: Feb. 9, 1999

(30) Foreign Application Priority Data

Feb. 9, 1998 (DE) ............................................. 198 05 091

(51) Int. Cl.$^7$ ................... B60T 8/00; B60T 8/32; B60T 8/60; B60T 13/74; F16D 65/21
(52) U.S. Cl. ............... 303/177; 303/191; 303/20; 188/1.11 R
(58) Field of Search ..................... 303/177, 112, 303/191, 155, 3, 183, 20, 9.61; 188/156, 158, 162, 1.11 R, 1.11 E, 181 T, 72.1, 72.7, 72.8; 701/70, 80, 35; 340/467; 324/162; 702/141; 73/510, 503, 489, 9

(56) References Cited

U.S. PATENT DOCUMENTS

| | | | |
|---|---|---|---|
| 4,790,606 | * | 12/1988 | Reinecke ......................... 188/1.11 E |
| 4,818,037 | * | 4/1989 | McEnnan ............................. 303/183 |
| 5,125,483 | * | 6/1992 | Kitagawa et al. ................ 188/1.11 E |
| 5,172,960 | * | 12/1992 | Chareire ............................... 303/9.61 |
| 5,669,678 | * | 9/1997 | Stumpe et al. ........................... 303/3 |
| 5,765,931 | * | 6/1998 | Ito et al. ............................... 303/183 |
| 5,806,938 | * | 9/1998 | Stumpe et al. ........................... 303/3 |
| 5,915,504 | * | 6/1999 | Döricht ................................. 188/72.1 |
| 5,975,250 | * | 11/1999 | Brandmeier et al. ........... 188/1.11 E |
| 6,000,507 | * | 12/1999 | Böhm et al. ..................... 188/1.11 E |
| 6,030,054 | * | 2/2000 | Doericht ................................. 303/20 |

FOREIGN PATENT DOCUMENTS

| | | |
|---|---|---|
| 3805589A1 | 8/1989 | (DE). |
| 4316993 | * 11/1994 | (DE). |
| 19615186C1 | 8/1997 | (DE). |
| 0626297A1 | 11/1994 | (EP). |

OTHER PUBLICATIONS

Published International Application No. 97/03869 (Maisch), dated Feb. 6, 1997.

* cited by examiner

*Primary Examiner*—Douglas C. Butler
(74) *Attorney, Agent, or Firm*—Herbert L. Lerner; Laurence A. Greenberg; Werner H. Stemer

(57) ABSTRACT

The deceleration o motor vehicle resulting from a vehicle brake is defined as the difference between a total deceleration of the motor vehicle and decelerations caused by the engine, wind, friction and grade, and a product of contact-pressure forces of the vehicle brake using a proportionality factor which is dependent on a brake temperature and a load being carried. The ratio of the two values is then used as a parameter for correcting the proportionality factor.

7 Claims, 2 Drawing Sheets

METHOD FOR DETERMINING THE DECELERATION OF A MOTOR VEHICLE

BACKGROUND OF THE INVENTION

Field of the Invention

The invention relates to a method for determining a deceleration of a motor vehicle from the vehicle brake system.

The requirements for modern brake systems for motor vehicles are becoming increasingly stringent now a days. For example, antilock braking devices, driving stability controllers, drive slip controllers and traction controls are making wheel-selective brake actions necessary. This is achieved by brake systems which have an electromechanical wheel brake actuator on each wheel, mounted on the wheel brake caliper such as those described in German Patent DE 196 15 186 C1.

A critical criterion for the effectiveness of such additional functions is that the current total deceleration of the motor vehicle be defined as exactly as possible. As long as the wheel rotation speeds are proportional to the vehicle speed, that is to say the wheels show no tendency to become locked and the wheel slip is thus negligible, the total deceleration is essentially defined by the deceleration by the vehicle brake, called the braking deceleration in the following text.

The braking deceleration is a function of the contact-pressure forces of the brake pads on the brake disk and, in the case of hydraulic servo-assistance, the pressures (which are directly proportional to the contact-pressure forces) in the wheel brake cylinders (brake pressures) can, in particular, also be used as function variables here. Knowledge of the precise relationship between the braking deceleration and the contact-pressure force is of major importance for modern brake systems.

SUMMARY OF THE INVENTION

It is accordingly an object of the invention to provide a method for determining the deceleration of a motor vehicle that overcomes the above-mentioned disadvantages of the prior art methods of this general type, which allows the braking deceleration of a motor vehicle to be defined as a function of the contact-pressure forces. The proportionality factor between these variables is intended to be matched to the vehicle mass and to the brake temperature.

With the foregoing and other objects in view there is provided, in accordance with the invention, an improved method for determining a deceleration of a motor vehicle due to a vehicle brake, the improvement which includes: calculating the deceleration as a product of a contact-pressure force of the vehicle brake and a proportionality factor being dependent on the contact-pressure force, a brake temperature and a vehicle mass without the brake temperature and the vehicle mass being explicitly defined.

The invention has the advantage that sensors for detecting the contact-pressure forces, in particular brake pressure sensors, provide relatively accurate and low-noise results, so that the sensor signals need not necessarily be averaged or filtered. Short-term availability of current braking deceleration values is thus also ensured. In this case, these values can also be associated with the individual wheels. While the influence of the load being carried is evident even before the start of a braking process, brake fading starts to occur only in the course of braking. It is thus possible to distinguish between the two effects. Since the respectively current relationship between the contact-pressure force and the braking deceleration is now known, a fixed characteristic can be defined between the brake pedal force and the braking deceleration. In the process, a matched contact-pressure force is associated with any given brake pedal position. Furthermore, if the wheels have a tendency to lock, that is to say when wheel slip increases, the braking deceleration calculated from the contact-pressure forces can advantageously be used to define the vehicle deceleration which is actually occurring, without having to define the coefficient of friction explicitly for this purpose.

With the foregoing and other objects in view there is also provided, in accordance with the invention, an improved method for determining a total deceleration of a motor vehicle, the improvement which includes: calculating a braking deceleration as a product of a contact-pressure force of a vehicle brake and a proportionality factor being dependent on the contact-pressure force, a brake temperature and a vehicle mass without the brake temperature and the vehicle mass being explicitly defined; determining an engine deceleration; determining a wind deceleration; determining a friction deceleration; determining a grade deceleration; and deriving the total deceleration by adding together the braking deceleration, the engine deceleration, the wind deceleration, the friction deceleration and the grade deceleration.

Other features which are considered as characteristic for the invention are set forth in the appended claims.

Although the invention is illustrated and described herein as embodied in a method for determining the deceleration of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The precise relationship between a braking deceleration and a contact-pressure force can be described by a proportionality factor.

With the knowledge of the proportionality factor, it is possible to define the braking deceleration that can be achieved for given contact-pressure forces. This allows for considerable improvements in various brake functions, for example in the case of anti-lock braking and driving stability controllers already mentioned initially, or the control of an electrical brake system. However, a value of the proportionality factor depends on the one hand on a mass of a vehicle and on the other hand on a brake temperature when brake fading occurs, so that it would have to be continuously redefined during vehicle operation. However, since neither the vehicle mass and the brake temperature nor the contact-pressure forces are known in a conventional vehicle, the relationship between the contact-pressure force and the braking deceleration has not been used in known brake systems so far.

For calculation purposes, the braking deceleration is given by the difference between the total deceleration and the decelerations resulting from the engine (engine deceleration), wind (wind deceleration), friction (friction deceleration) and grade (grade deceleration). In this case, all the values can be calculated independently of one another, based on measurements from various sensors, for example wheel rotation speed sensors, engine speed sensors and longitudinal deceleration sensors. However, the braking deceleration is not determined explicitly in known brake systems. Only the vehicle speed and the total deceleration are defined from measurements of the wheel rotation speeds. Since the rotation speed sensor signals are in this case subject to severe interference or noise in some cases, these signals have to be averaged or filtered. In order to make it possible to react better to changes in roadway conditions, coefficients of friction are in some cases also roughly estimated. In contrast to hydraulic brake systems, electrical brake systems offer the capability for a free association between the braking forces and specific pedal positions. Since, the influences of different vehicle masses and of brake fading have not in the past been considered in the calculation of the vehicle deceleration, the reaction of the motor vehicle to operation of the brakes by the driver in some cases fluctuate considerably in this regard.

Figure 1:
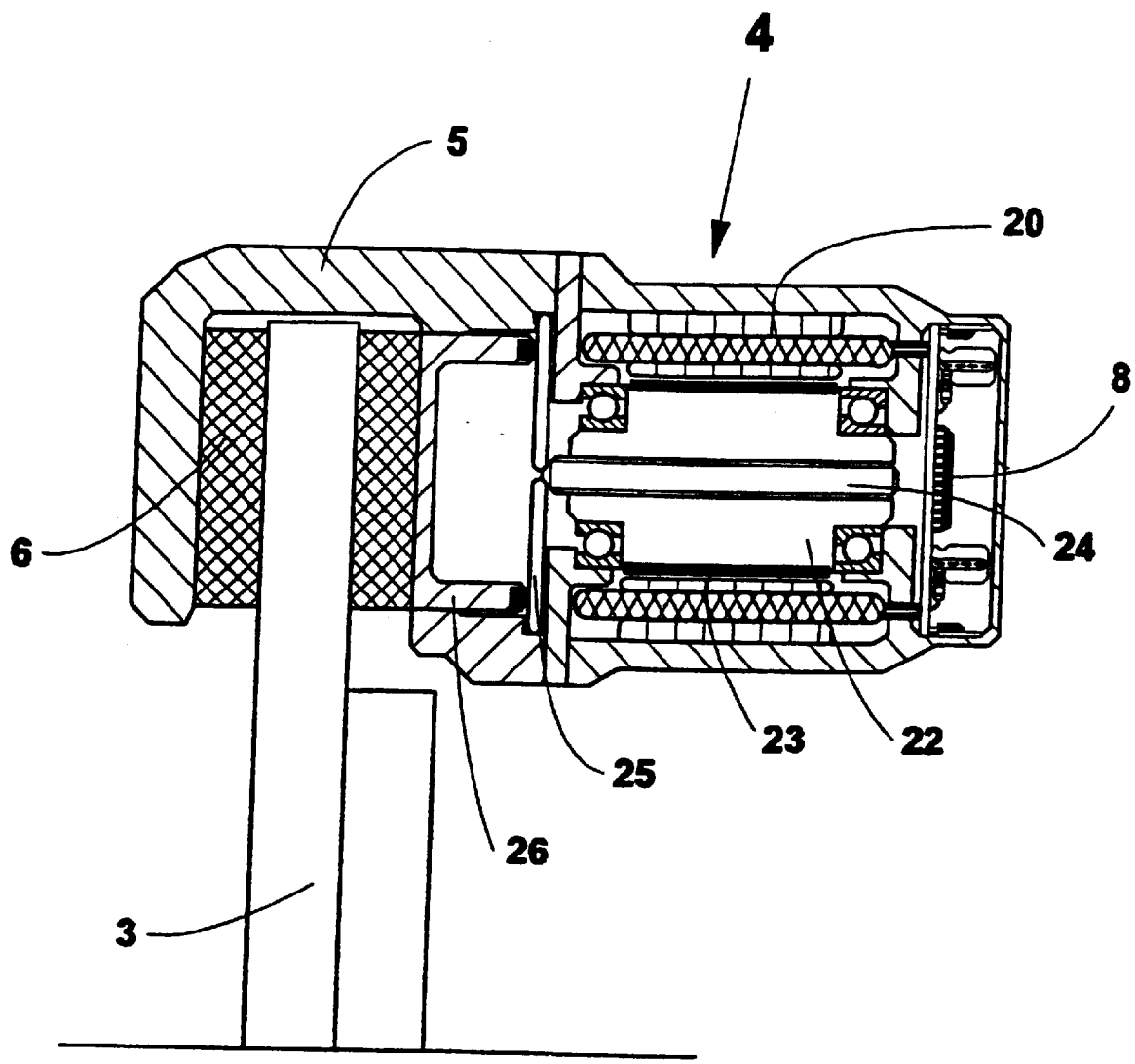
FIG. 1 is a cross-sectional view of a wheel brake actuator used in an electrically operated brake system according to the invention.

In all the figures of the drawing, sub-features and integral parts that correspond to one another bear the same reference symbol in each case. Referring now to the figures of the drawing in detail and first, particularly, to FIG. 1 thereof, there is shown a wheel brake actuator 4 that is mounted directly on a brake caliper 5 and is driven by a brushless electric motor 20 which is constructed, for example, as an asynchronous machine, a synchronous machine or an electronically commutated DC motor. In the illustrated exemplary embodiment, control electronics 8 for the electric motor 20 are integrated directly in the housing of the wheel brake actuator 4 but, if additional cables are accepted, the electronics can also be accommodated in a separate housing.

The rotor of the electric motor 20 is formed by a spindle nut 22 of a spindle drive which is constructed, for example, as an epicyclic drive, a ball and spindle drive, a trapezoidal threaded drive or the like. Such spindle drives are known per se (for example an integral RGTB threaded nut for the INA Lineartechnik oHG). A number of rotor magnets 23 are fitted on the spindle nut 22 of the spindle drive. The rotary motion of the rotor is converted by the spindle drive into a translational movement of a spindle 24.

The axial force of the spindle 24 is multiplied by a mechanical step-up device 25 in a form of a lever mechanism and is transmitted to a wheel brake cylinder piston 26. The wheel brake cylinder piston 26 presses brake pads 6 against a brake disk 3 and thus produces a braking torque on the brake disk 3, which leads to deceleration of the motor vehicle.

Figure 2:
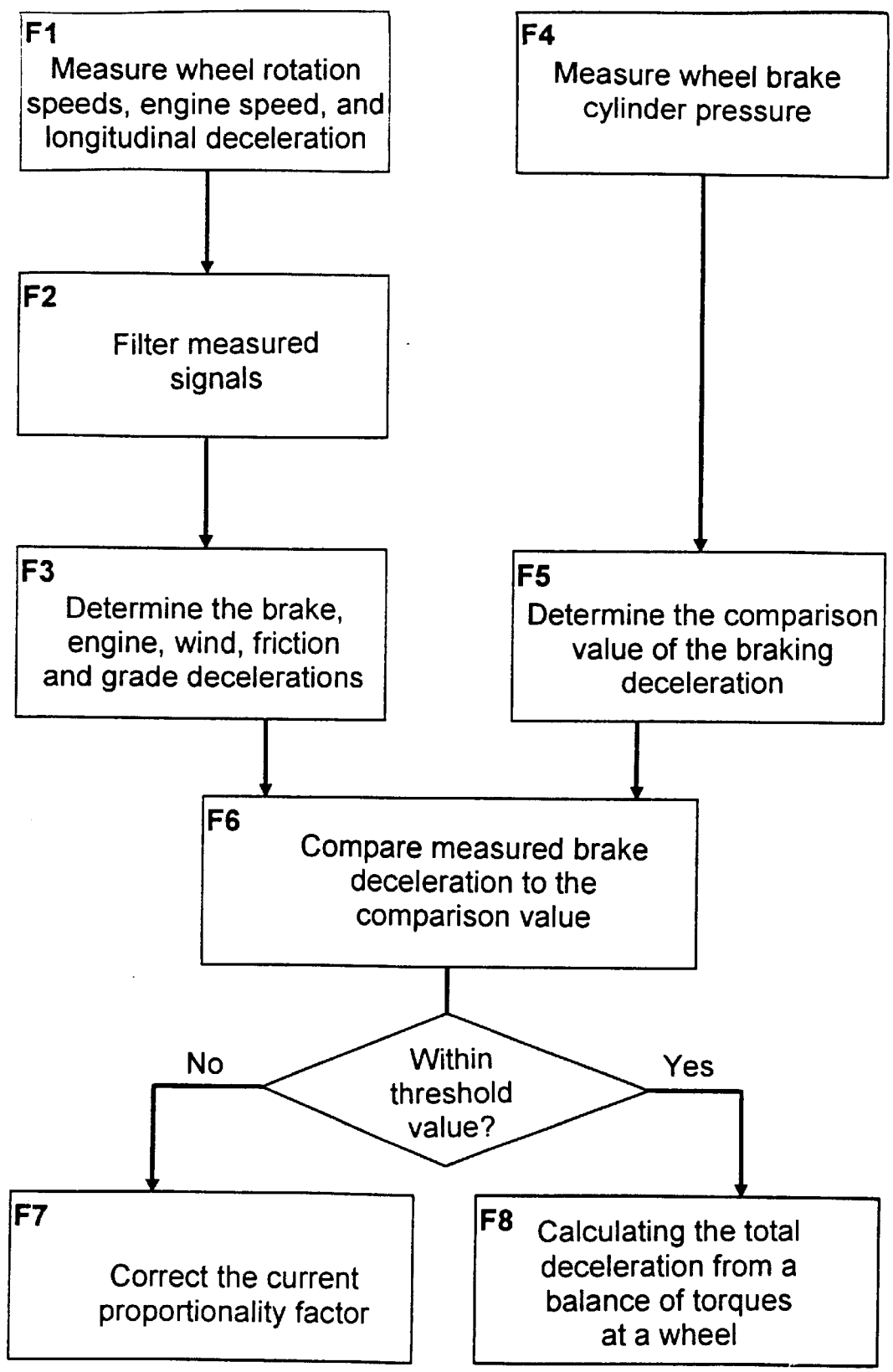
FIG. 2 is a flowchart of a method for defining a braking deceleration of a motor vehicle.

The flowchart in FIG. 2 will now be used as the basis for describing the method according to the invention, which makes it possible to define the vehicle deceleration produced by such a brake system from the pressures measured in the wheel brake cylinders. First of all, in a step F1, the values of the wheel rotation speeds, the engine speed and the longitudinal deceleration are recorded by various sensors. The longitudinal deceleration is in this case the output signal from the longitudinal deceleration sensor, that is to say the longitudinal force on a known mass particle. In a step F2, the sensor signals are filtered in order to overcome any interference and noise signals. Then, in a step F3, the filtered measurement data are used to define the current values of the total deceleration, the engine deceleration, the wind deceleration, the friction deceleration and the grade deceleration. In this case, the total deceleration $a_G$ is calculated from the wheel radius $r_R$ and the wheel acceleration $dn_R$, which is obtained from an averaged derivative of the wheel rotation speeds.

$$a_G = dn_R * r_R \quad (I)$$

The distance difference caused by the steering angle is taken into account by an appropriate correction to the wheel rotation speeds.

An engine drag torque $M_s$, called a drag torque for short in the following text, is a function of the engine speed and is either taken from a family of characteristics or is calculated explicitly. The engine speed $n_M$ and a mean wheel rotation speed $n_R$ are used to convert the drag torque to a wheel torque $M_R$ in accordance with the transmission step-down ratio.

$$M_R = n_M/n_R * M_S \quad (II)$$

Taking account of the wheel radius and vehicle mass $m_F$, this is used to define the engine deceleration $a_M$.

$$a_M = M_R/(m_f * r_R) \quad (III)$$

Since the vehicle mass is not known, it is estimated using the empty weight plus 50% of the maximum load that can be carried. If the measured wheel rotation speed corresponds to the idle engine speed, this is the case, in particular, when the clutch is disengaged or the drive has been shifted to neutral, the engine deceleration is set equal to zero since, in this case, no torque is either emitted or absorbed.

The vehicle speed $V_F$ is also calculated from the wheel rotation speeds. The wind deceleration aw is defined from the engine torque $M_M$, the engine circular frequency $om_M$, the maximum speed $V_{max}$ that indicates the maximum vehicle speed, and the vehicle mass.

$$a_W = ((M_M * om_M)/(V_{max}^3 * m_F)) * V_F^2 \quad (IV)$$

In this case, the values at the maximum speed are in each case used for the engine torque and an engine circular frequency.

A friction deceleration $a_R$ is assumed to be constant, or is calculated as a function of the vehicle speed, the vehicle mass and a coefficient of static friction. However, the friction deceleration is often ignored owing to its minor influence on the total deceleration.

If the vehicle is equipped with a longitudinal deceleration sensor, which defines the longitudinal deceleration $a_L$ of the vehicle with respect to a reference system rolling in an equivalent manner but without friction, then the grade deceleration $a_N$ can be calculated.

$$a_N = a_G - a_L \qquad (V)$$

In longitudinal deceleration sensors, the measurement is always carried out parallel to the vehicle longitudinal axis. If this is not parallel to the direction of motion of the vehicle, then the measured value is corrected by a factor that is dependent on the steering angle, the vehicle speed and the brake dive of the front axle. As an alternative to this, the grade deceleration can also be calculated by integrating the signals from a pitch-rate sensor.

Finally, the individual deceleration values are used to calculate a main value $a_{BH}$ of the braking deceleration.

$$a_{BH} = a_G - (a_M + a_W + a_R + a_N) \qquad (VI)$$

This gives a relatively exact value for the braking deceleration.

In parallel with this, the wheel brake cylinder pressures measured with the aid of brake pressure sensors in a step F4 are used in a step F5 to calculate the comparison value $a_{BV}$ of the braking deceleration, as the product of the brake pressure $p_B$ and a proportionality factor k which is dependent on the brake pressure, the vehicle mass and the brake temperature $t_B$.

$$a_{BV} = k(p_B, m_F, t_B) * p_B \qquad (VII)$$

The proportionality factor is in this case calculated from $$k = c_1 * (1 - c_2 * p_B) \qquad (VIII)$$

In this case, for example, the parameter $c_2$, corresponding to the characteristics of the brake pad and the brake disk, can be set to be constant and $c_1$ can be used as a correction factor to take account of the current vehicle load and the brake fading state. An initial value for this proportionality factor is defined on the basis of a random operating state, for example a cold brake system with a vehicle mass which is composed of the empty weight and 50% of the maximum permissible load.

In a step F6, the results of the two calculation methods are now compared. As long as a predetermined threshold value, for example a maximum discrepancy equal to 10%, is not exceeded in this case, the resultant ratio is a good measure of the error in the current proportionality factor. This can then be corrected as appropriate in a step F7. The current relationship between the contact-pressure forces and the braking deceleration is thus available all the time and can advantageously be used for various additional functions in a brake system. If, in contrast, the braking deceleration ratio exceeds the predetermined threshold value, then this is an indication that an error has occurred in the calculation of the braking deceleration main value. This is the case in particular if the wheels start to lock, so that the wheel slip increases considerably so that the proportionality (on which the calculation is based) between the wheel rotation speeds and the vehicle speed no longer exists.

If the wheel slip increases, the wheel moment of inertia $M_T$ can no longer be ignored, so that an additional, slip moment $M_{Schl}$, which can be determined by calculation, is produced by the wheel acceleration $dn_R$.

$$M_{Schl} = M_T * dn_R \qquad (IX)$$

The wheel moment of inertia in this case includes the mass moments of inertia of all the rotating parts, for example the brake disk, the drive shaft, and the transmission shaft.

The torque equilibrium of one wheel is now estimated in a step F8. In this case, the slip torque must be equal to the sum of all the other torques that act. The torques are composed, on the one hand, of a total torque $M_G$ originating from the vehicle and, on the other hand, from a transmission torque $M_{Ü}$, which is produced by the power transmitted between the tire and the roadway and which characterizes the currently effective vehicle deceleration $a_{Eff}$ (effective deceleration). The braking torque $M_B$, which can be calculated from the braking deceleration comparison value $a_{BV}$, and the tire radius $r_R$, is now used as a sensible approximation to the total torque.

$$M_G \approx M_B = a_{BV} * r \qquad (X)$$

In addition, other torques, for example the engine drag torque may also be taken into account.

The transmission torque $M_{Ü}$ can thus be calculated from the difference between the slip moment and the total torque or braking torque.

$$M_{Ü} = M_{Schl} - M_G \approx M_{Schl} - M_B \qquad (XI)$$

The tire radius and the vehicle mass can now, finally, be used to provide a good approximation of the effective deceleration $a_{Eff}$.

$$a_{Eff} = M_{Ü} / r_R * m_F) \qquad (XII)$$

This gives considerably more accurate results for the effective deceleration than the conventional method for rough estimation of the coefficient of friction, for example based on the gradient at which a wheel starts to slip to an increased extent.

I claim:

1. An improved method for determining a deceleration of a motor vehicle due to a vehicle brake, the improvement which comprises:

calculating a deration of a motor vehicle caused only by a vehicle as a product of a contact-pressure force of the vehicle brake and a proportionality factor being dependent on the contact-pressure force, a brake temperature and a vehicle mass without the brake temperature and the vehicle mass being explicitly defined.

2. The method according to claim 1, which comprises:

calculating a main value of the deceleration from at least one of wheel rotation speeds, engine speed, longitudinal deceleration and engine drag torque;

calculating a comparison value of the deceleration from measurements of the contact-pressure force; and determining a value of the proportionality factor from a ratio of the main value and the comparison value.

3. The method according to claim 2, which comprises correcting the value of the proportionality factor if the ratio does not exceed a specific threshold value.

4. The method according to claim 2, which comprises correcting the proportionality factor in dependence on a load being carried and a grade even during phases without a braking operation.

5. The method according to claim 2, which comprises resetting an element of the proportionality factor that is dependent on the brake temperature to a predetermined initial value during phases without a braking operation.

6. The method according to claim 2, which comprises using the deceleration in phases in which the ratio exceeds a threshold value to define an effective vehicle deceleration from a torque equilibrium at a wheel.

7. An improved method for determining a total deceleration of a motor vehicle, the improvement which comprises:

calculating a braking deceleration as a product of a contact-pressure force of a vehicle brake and a proportionality factor being dependent on the contact-pressure force, a brake temperature and a vehicle mass without the brake temperature and the vehicle mass being explicitly defined;

determining an engine deceleration;

determining a wind deceleration;

determining a friction deceleration;

determining a grade deceleration; and deriving the total deceleration by adding together the braking deceleration, the engine deceleration, the wind deceleration, the friction deceleration and the grade deceleration.

* * * * *